United States Patent
Nakano et al.

(10) Patent No.: US 7,859,665 B2
(45) Date of Patent: Dec. 28, 2010

(54) POLARIZATION ANALYZING SYSTEM, EXPOSURE METHOD, AND METHOD FOR MANUFACTURING SEMICONDUCTOR DEVICE

(75) Inventors: Ayako Nakano, Yokohama (JP); Takashi Sato, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 12/385,509

(22) Filed: Apr. 9, 2009

(65) Prior Publication Data

US 2009/0202136 A1  Aug. 13, 2009

Related U.S. Application Data

(63) Continuation of application No. 11/052,841, filed on Feb. 9, 2005, now Pat. No. 7,534,533.

(30) Foreign Application Priority Data

Feb. 10, 2004  (JP)  ............................ P2004-033376

(51) Int. Cl.
*G01J 4/00* (2006.01)
*G03F 7/00* (2006.01)

(52) U.S. Cl. .................. 356/364; 430/30; 430/311; 430/394; 430/312

(58) Field of Classification Search ......... 356/364–368; 430/30, 311, 312, 394, 322
See application file for complete search history.

(56) References Cited

U.S. PATENT DOCUMENTS

| | | | |
|---|---|---|---|
| 5,300,972 A | 4/1994 | Kamon | |
| 5,422,205 A * | 6/1995 | Inoue et al. | 430/5 |
| 5,815,247 A | 9/1998 | Poschenrieder et al. | |
| 6,660,458 B2 | 12/2003 | Lin | |
| 7,000,215 B2 * | 2/2006 | Nakano et al. | 716/19 |
| 2004/0088675 A1 | 5/2004 | Nakano et al. | |

FOREIGN PATENT DOCUMENTS

| | | |
|---|---|---|
| JP | 5-226226 | 9/1993 |
| JP | 6-20912 | 1/1994 |
| JP | 7-235474 | 9/1995 |
| JP | 8-8177 | 1/1996 |
| JP | 9-160219 | 6/1997 |

OTHER PUBLICATIONS

Notice of Grounds for Rejection issued by the Japanese Patent Office on Dec. 19, 2006, for Japanese Patent Application No. 2004-33376, and English-language translation thereof.

* cited by examiner

*Primary Examiner*—L. G Lauchman
(74) *Attorney, Agent, or Firm*—Finnegan, Henderson, Farabow, Garrett & Dunner, L.L.P.

(57) ABSTRACT

A polarization analyzing system includes a data collector collecting information on resist patterns formed over step patterns by first and second lights, the first and second lights being polarized parallel and perpendicular to the step patterns, a residual resist analyzer obtaining first and second relations between a ratio of a space to a line width of the resist patterns and the first and second residues, the first and second residues remaining at orthogonal points of the step patterns and the resist patterns, and a direction chooser choosing an optimum polarization direction reducing residues by comparing the first and second relations.

6 Claims, 15 Drawing Sheets

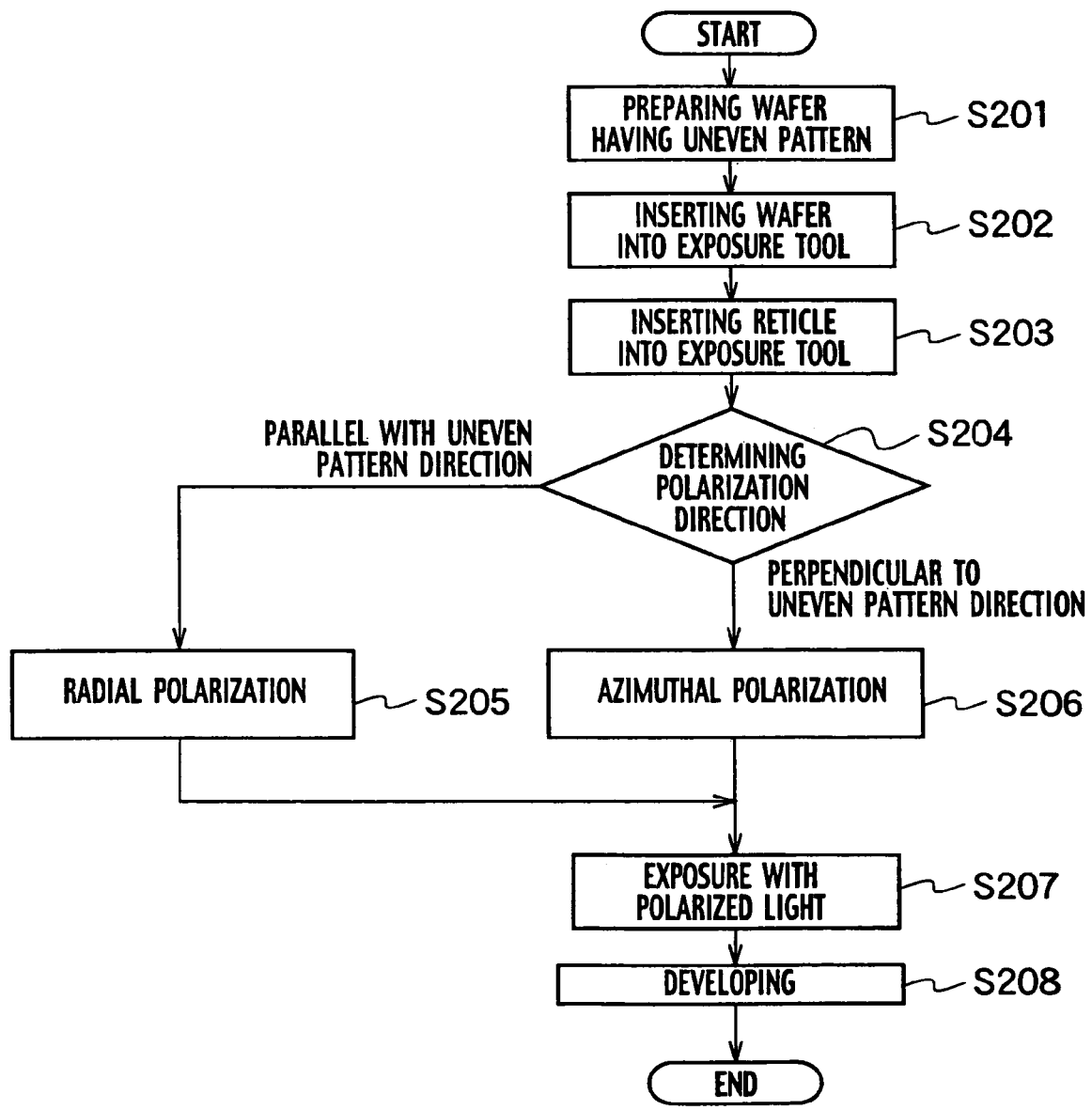

POLARIZATION ANALYZING SYSTEM, EXPOSURE METHOD, AND METHOD FOR MANUFACTURING SEMICONDUCTOR DEVICE

CROSS REFERENCE TO RELATED APPLICATIONS AND INCORPORATION BY REFERENCE

This is a continuation of application Ser. No. 11/052,841, filed Feb. 9, 2005 now U.S. Pat. No. 7,534,533, which is incorporated herein by reference.

This application is based upon and claims the benefit of priority from prior Japanese Patent Application P2004-033376 filed on Feb. 10, 2004; the entire contents of which are incorporated by reference herein.

BACKGROUND OF THE INVENTION

1. Field of the Invention

The present invention relates to lithography techniques and in particular to a polarization analyzing system, an exposure method, and a method for manufacturing a semiconductor device 2. Description of the Related Art To maximize integration of device components in an available semiconductor wafer area to fit more components in the same area, increased IC miniaturization is utilized. Reduced dimension of features formed on the semiconductor wafer are needed for increased integration density to meet the requirement of very large scale integration (VLSI). As the dimensions of the features are reduced, the features must be aligned with a greater and greater degree of precision. In a manufacturing process for the MOS transistor, a gate electrode also continues to shrink in size over time. Therefore, increased preciseness in an ion implantation process is required. Such gate electrode of the MOS transistor is disposed on the wafer like a step pattern extended in a predetermined direction. When a resist pattern, perpendicular to the step pattern is formed over the step pattern on the wafer by lithography process, residual resists may remain at an orthogonal point of the step pattern and the resist pattern, or a line width of the resist, pattern may be decreased at the orthogonal point. In Japanese Patent Laid-Open Publication No. Hei5-226226, a method for preventing the decrease of the line width is described. In the method, an illumination light is polarized such that the electric field of the illumination light is only perpendicular to the step pattern. However, a method for reducing the residual resist has not been proposed. Although the optical proximity effect correction (OPC) method is widely spread to reproduce a designed circuit pattern on the wafer, such OPC method has not been effective in reducing the residual resist remaining at the orthogonal point of the step pattern and the resist pattern.

SUMMARY OF THE INVENTION

An aspect of present invention inheres in a polarization analyzing system according to an embodiment of the present invention. The polarization analyzing system includes a data collector configured to collect an information on resist patterns formed over step patterns disposed on wafers by first and second lights, respectively, the resist patterns being perpendicular to the step patterns, the first and second lights being polarized parallel and perpendicular to the step patterns, respectively, a residual resist analyzer configured to obtain first and second relations between a ratio of a space to a line width of the resist patterns and amounts of first and second residual resists on the wafers, respectively, the first and second residual resists remaining at orthogonal points of the step patterns and the resist patterns formed by the first and second lights, respectively, and a direction chooser configured to choose an optimum polarization direction reducing residual resists by comparing the first and second relations.

Another aspect of the present invention inheres in an exposure method according to an embodiment of the present invention. The exposure method includes forming a first resist pattern over, a step pattern disposed on a wafer by a first light, the first resist pattern being perpendicular to the step pattern, the first light being polarized parallel to the step pattern, obtaining a first relation between a ratio of a space to a line width of the first resist pattern and an amount of a first residual resist on the wafer, the first residual resist remaining at an orthogonal point of the step pattern and the first resist pattern, forming a second resist pattern over the step pattern disposed on the wafer by a second light, the second resist pattern being perpendicular to the step pattern, the second light being polarized perpendicular to the step pattern, obtaining a second relation between a ratio of a space to a line width of the second resist pattern and an amount of a second residual resist on the wafer, the second residual resist remaining at an orthogonal point of the step pattern and the second resist pattern formed by the second light, and choosing an optimum polarization direction reducing residual resists by comparing the first and second relations.

Yet another aspect of the present invention inheres in a method for manufacturing a semiconductor device according to an embodiment of the present invention. The method for manufacturing the semiconductor device includes preparing first and second wafers on which first and second step patterns extended in a direction are disposed, respectively, coating first and second resists over the first and second step patterns on the first and second wafers, respectively, and inserting each of the first and second wafers into an exposure tool, projecting an image of a reticle onto each of the first and second resists by first and second lights to form first and second resist patterns, respectively, the first and second resist patterns being perpendicular to the first and second step patterns, respectively, the first and second lights being polarized parallel and perpendicular to the first and second step patterns, respectively, obtaining a first relation between ratio of a space to a line width of the first resist pattern and an amount of a first residual resist on the first wafer, the first residual resist remaining at an orthogonal point of the first step pattern and the first resist pattern, obtaining a second relation between a ratio of a space to a line width of the second resist pattern and an amount of a second residual resist on the second wafer, the second residual resist remaining at an orthogonal point of the second step pattern and the second resist pattern, determining an optimum polarization direction reducing residual resists by comparing the first and second relations, preparing a third wafer on which a third step pattern extended in the direction is disposed and coating a third resist over the third step pattern on the third wafer, and inserting the third wafer into the exposure tool and projecting a device pattern onto the third wafer by using a light polarized in the optimum polarization, direction.

Yet another aspect of the present invention inheres in the method for manufacturing these semiconductor device according to an embodiment of the present invention. The method for manufacturing the semiconductor device includes simulating formations of first and second resist patterns over first and second step patterns extended in a direction on first and second wafers by exposing resists to first and second lights, respectively, the first and second resist patterns being perpendicular to the first and second step patterns, respectively, the first and second, lights being polarized parallel and perpendicular to the first and second step patterns, respectively, obtaining a first relation between ratio of a space to a line width of the first resist pattern and an amount of a first residual resist on the first wafer, the first residual resist remaining at an orthogonal point of the first step pattern and the first resist pattern, obtaining a second relation between a ratio of a space to a line width of the second resist pattern and an amount of a second residual resist on the second wafer, the second residual resist remaining at an orthogonal point of the second step pattern and the second resist pattern, determining an optimum polarization direction reducing residual resists by comparing the first and second relations, preparing a third wafer on which a third step pattern extended in the direction is disposed and coating a third resist over the third step pattern on the third wafer, and inserting the third wafer into the exposure tool and projecting a device pattern onto the third wafer by using alight polarized in the optimum polarization direction.

BRIEF DESCRIPTION OF DRAWINGS

FIG. 20 is a flowchart depicting a method for manufacturing the semiconductor device in accordance with the modification of the embodiment of the present invention.

DETAILED DESCRIPTION OF THE INVENTION

Figure 1:
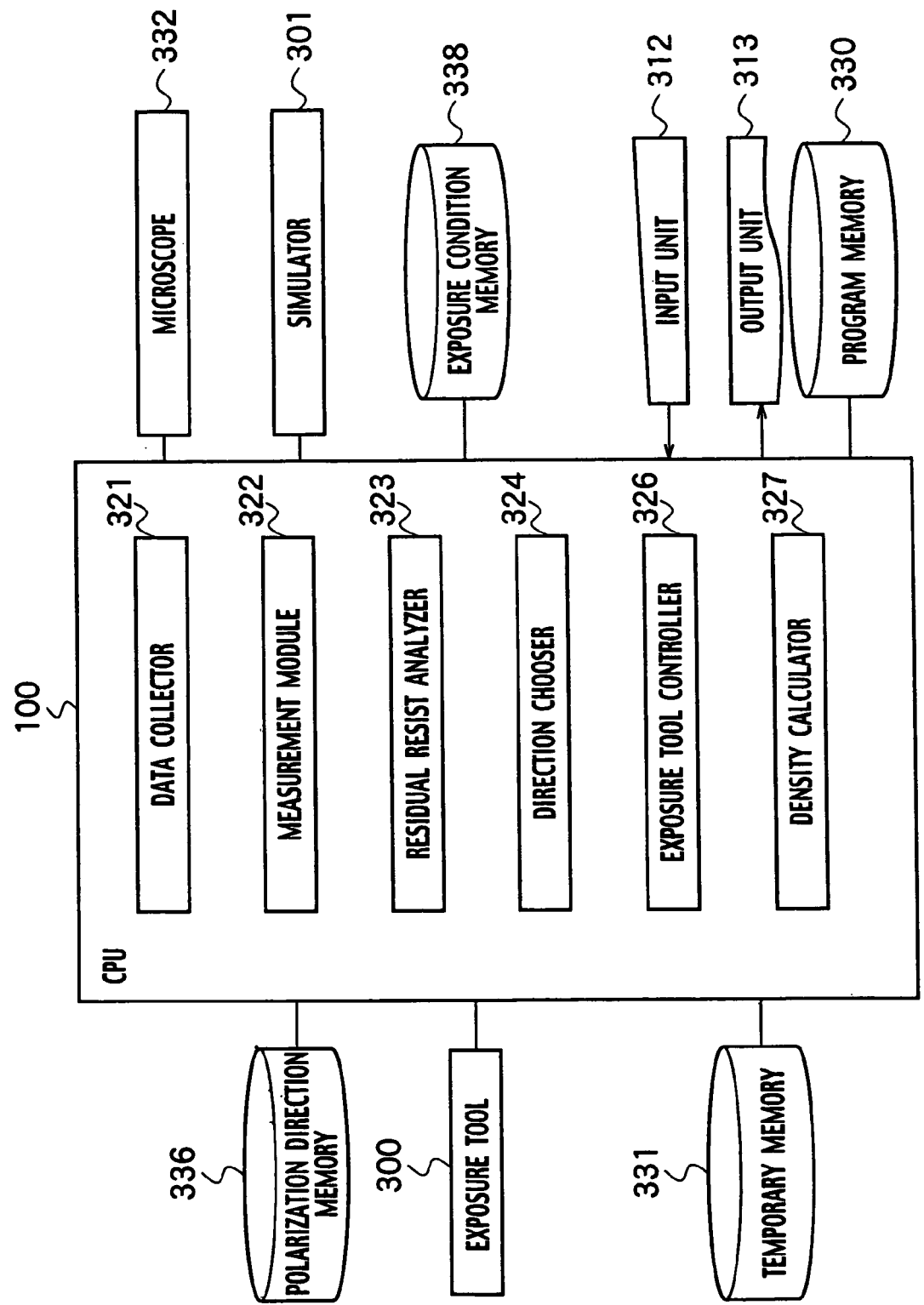
FIG. 1 is a diagram of a polarization analyzing system in accordance with an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

With reference to FIG. 1, a polarization analyzing system includes a central processing unit (CPU) 100. The CPU 100 includes a data collector 321, a residual resist analyzer 323, and a direction chooser 324. The data collector 321 is configured to collect information on resist patterns formed over step patterns disposed on wafers by first and second lights, respectively. Here, each of the resist patterns is perpendicular to each of the step patterns. The first and second lights are polarized parallel and perpendicular to the step patterns, respectively.

The residual resist analyzer 323 is configured to obtain first and second relations between a ratio of a space to a line width of the resist patterns and amounts of first and second residual resists on the wafers, respectively. Here, the first and second residual resists remain at orthogonal points of the step patterns and the resist patterns formed by the first and second lights, respectively. The direction chooser 324 is configured to choose an optimum polarization direction reducing residual resists by comparing the first relation and the second relation.

Figure 2:
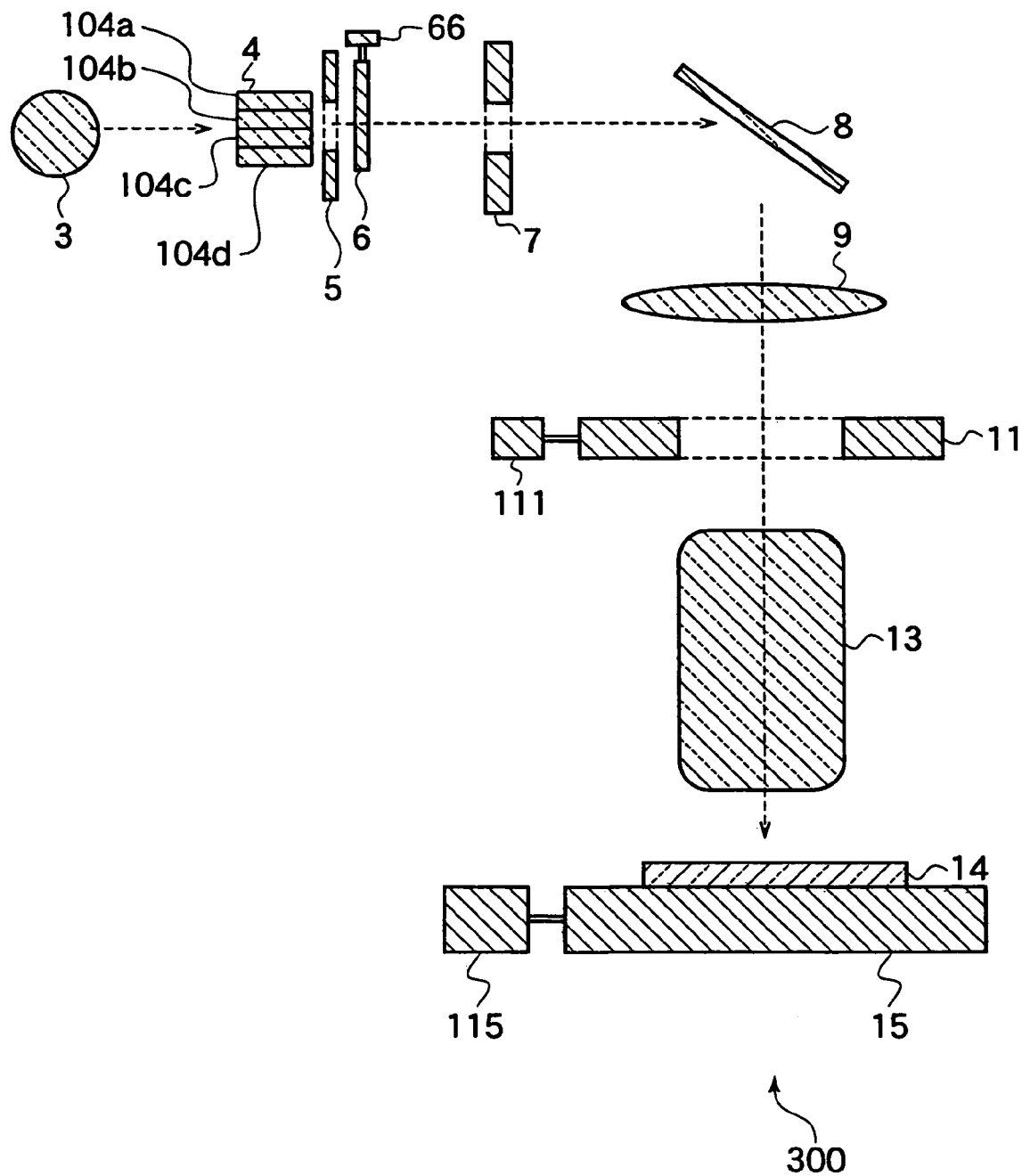
FIG. 2 illustrates an exposure tool in accordance with the embodiment of the present invention.

An exposure tool 300 is connected to the CPU 100. With reference to FIG. 2, the exposure tool 300 includes a light source 3 which irradiates illumination light such as a krypton fluoride (KrF) excimer laser with a wavelength of 248 nm, a fly-eye lens 4 which receives the illumination light irradiated from the light source 3, an illumination aperture 5 which shields marginal rays, a polarizer holder 6 which holds a polarizer polarizing the illumination light, a reticle blind 7 which defines an exposure field of the polarized illumination light, a reflecting mirror 8 which changes the traveling direction of the polarized illumination light, a condenser lens 9 which condenses the polarized illumination light reflected by the reflecting mirror 8, a reticle stage 11 placed below the condenser lens 9, a projection lens 13 which is placed below the reticle stage 11 and receives the polarized illumination light, and a wafer stage 15 placed below the projection lens 13.

The illumination light irradiated from the light source 3 penetrates into each of a plurality of lenses 104a, 104b, 104c and 104d which form the fly-eye lens 4. The illuminati on light transmitted through each of the plurality of lenses 104a-104d is irradiated onto an entire surface of an exposure field of a reticle placed on the reticle stage 11 through the polarizer held by the polarizer holder 6, the reflecting mirror 8 and the condenser lens 9. Hence, on the reticle, the polarized illumination lights transmitted through the plurality of lenses 104a-104d of the fly-eye lens 4 are superimpose don the others. Therefore, an even illumination is provided on the reticle.

Figure 3:
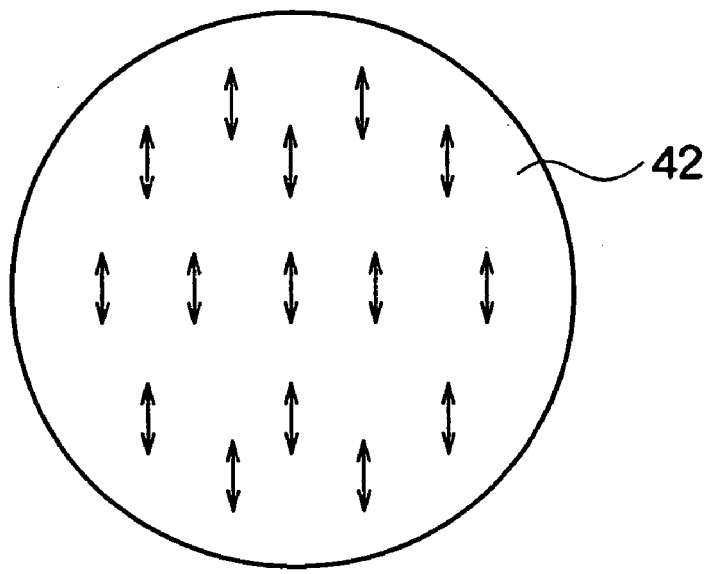
FIG. 3 is a first plan view of a polarizer, in accordance with the embodiment of the present invention.
Figure 4:
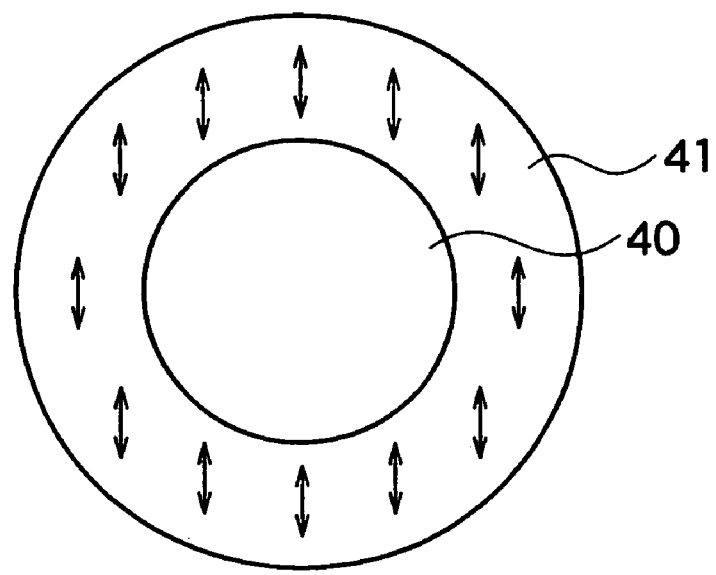
FIG. 4 is a second plan view of the polarizer in accordance with the embodiment of the present invention.

With reference next to FIG. 3, the polarizer held by the polarizer holder 6 includes a polarizing film 42 which confines an electric field of the illumination light to a direction indicated by arrows. Alternatively, as shown in FIG. 4, the polarizer may further include a light-shielding portion 40 on the center portion of a polarizing film 41. In FIG. 2, a polarizer holder rotator 66 is connected to the polarizer holder 6. The polarizer holder rotator 66 rotates the polarizer holder 6 holding the polarizer shown in FIG. 3 or FIG. 4. Therefore, the polarization direction of the polarized illumination light can be rotated around an optical axis in the exposure tool 300 shown in FIG. 2.

A reticle stage aligner 111 is connected to the reticle stage 11. The reticle stage aligner 111 moves the reticle stage 11 and determines the position where the reticle stage 11 is to be placed. Each of the testing reticles for quantifying the amount of the residual resists remaining at the orthogonal points of the step patterns and the resist patterns is mounted on the reticle stage 11.

Figure 5:
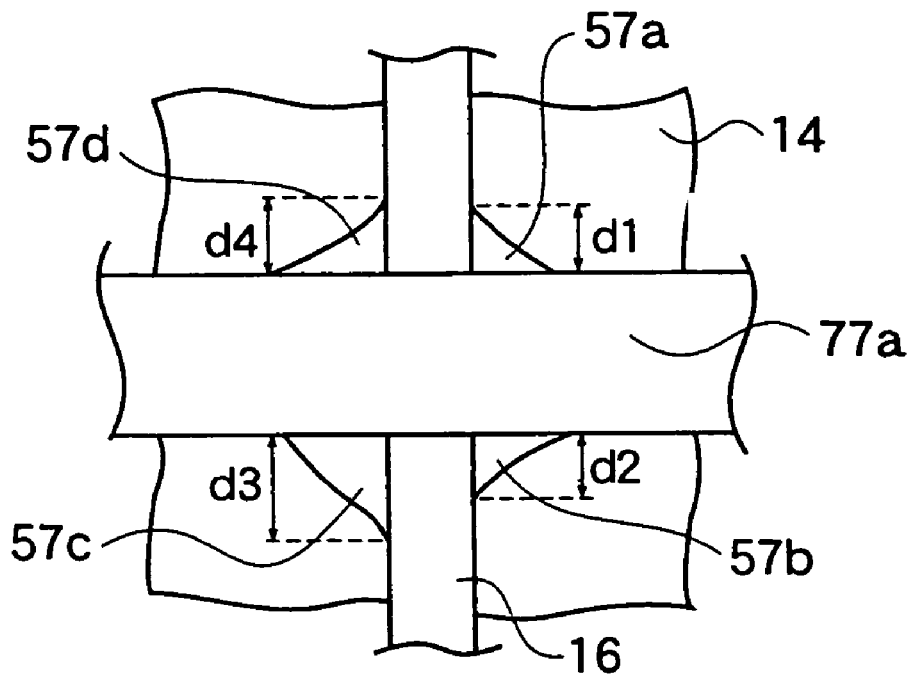
FIG. 5 is an enlarged plan view of a first resist pattern in accordance with the embodiment of the present invention.
Figure 6:
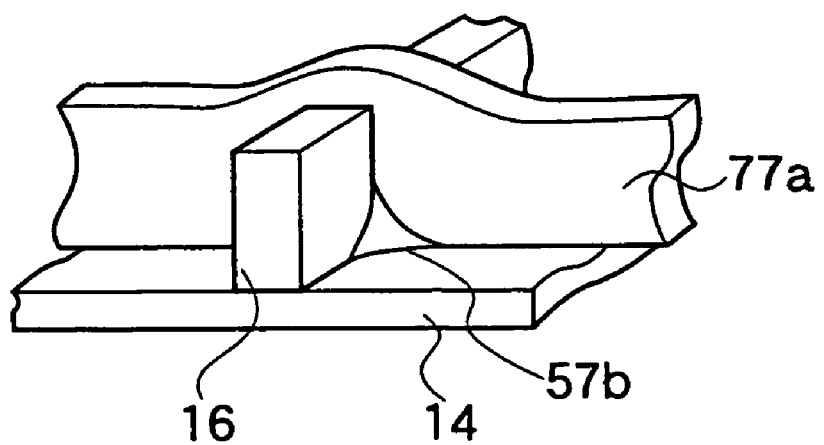
FIG. 6 is a perspective view of the first resist pattern in accordance with the embodiment of the present invention.

With reference to FIGS. 5 and 6, explanation for the amount of the residual resists remaining at the orthogonal points of the step patterns and the resist patterns is described. A first step pattern 16 shown in FIG. 5 extended in a predetermined direction is disposed on a first wafer 14 to be mounted on the wafer stage 15 shown in FIG. 2. Further, a first resist pattern 77a perpendicular to the first step pattern 16 is formed on the first wafer 14. In the proximity of an orthogonal point of the first step pattern 16 and the first resist pattern 77a, each of the spreading portions 57a, 57b, 57c and 57d of the first residual resists remains after a lithography process for forming the first resist pattern 77a. Here, a perpendicular distance from an edge of the first resist pattern 77a to an edge of the spreading portion 57a is defined as an amount of first residual resist "$d_1$". Similarly, a perpendicular distance from an edge of the first resist pattern 77a to an edge of the spreading portion 57b is defined as an amount of first residual resist "$d_2$", a perpendicular distance from an edge of the first resist pattern 77a to an edge of the spreading portion 57c is defined as an amount of first residual resist "$d_3$", and a perpendicular distance from an edge of the first resist pattern 77a to an edge of the spreading portion 57d is defined as an amount of first residual resist "$d_4$".

Figure 7:
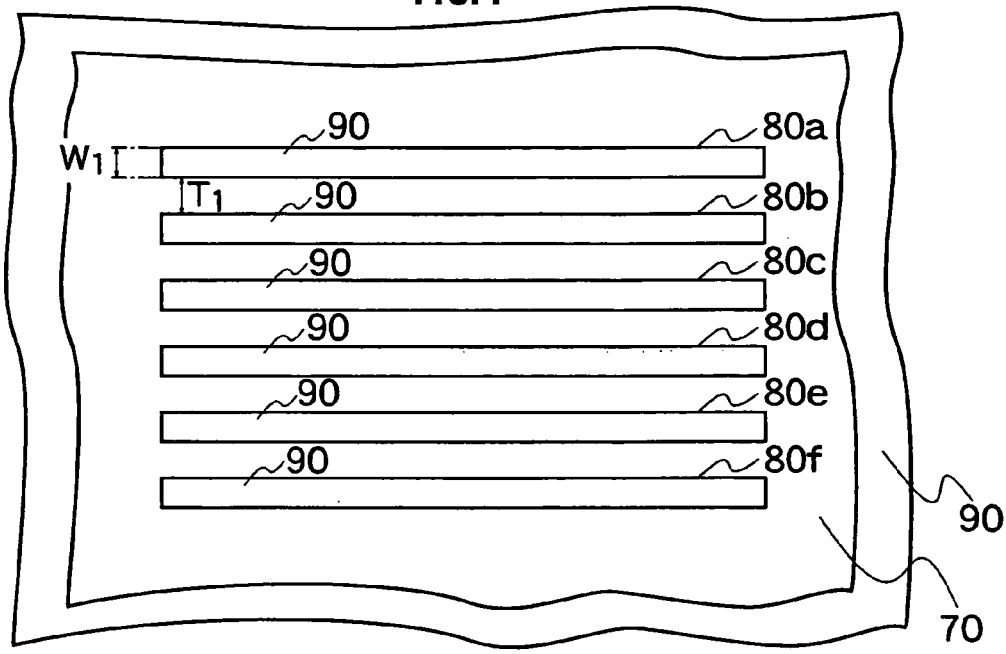
FIG. 7 is a plan view of a first testing reticle in accordance with the embodiment of the present invention.
Figure 8:
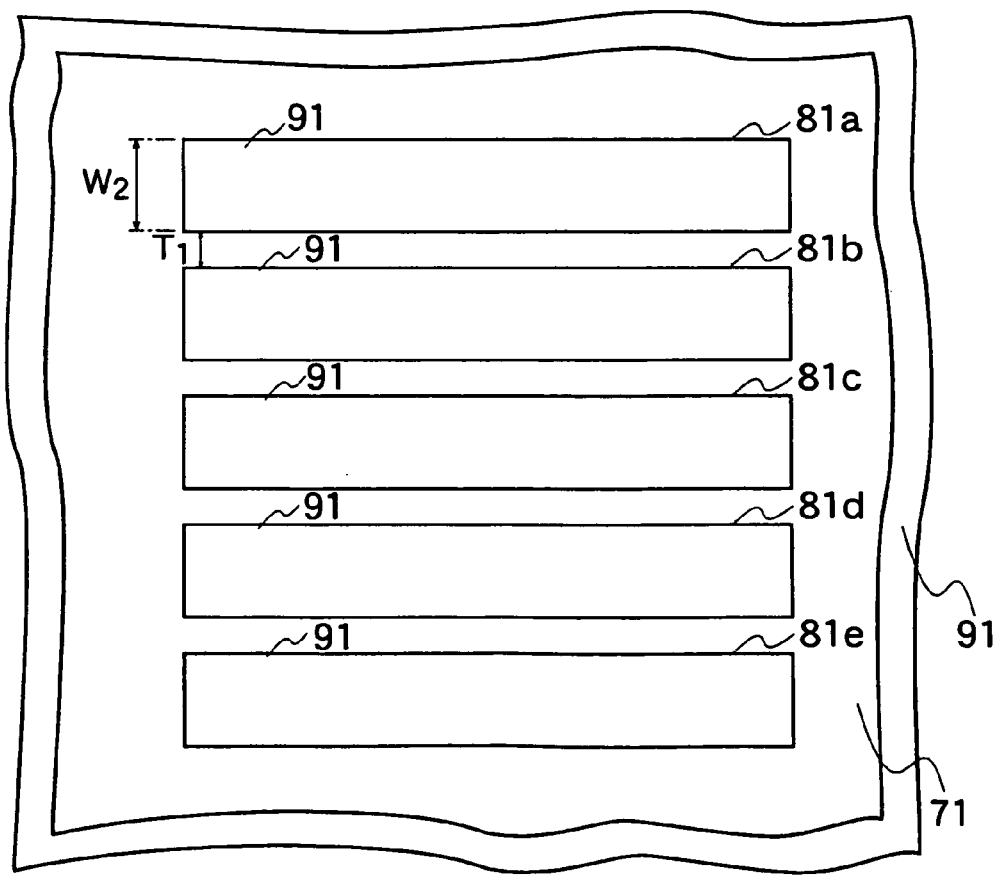
FIG. 8 is a plan-view of a second testing reticle in accordance with the embodiment of the present invention.
Figure 9:
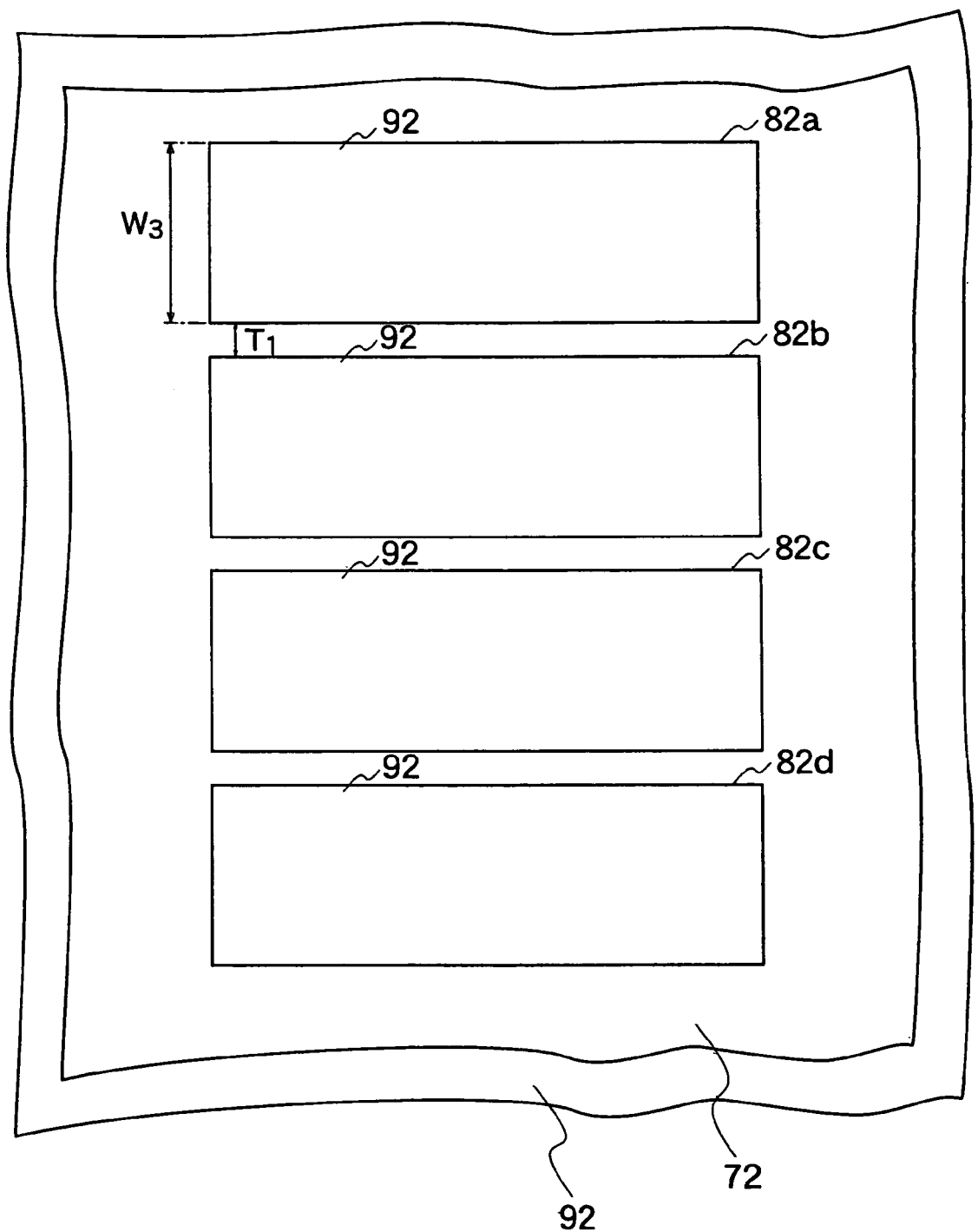
FIG. 9 is a plan view of a third testing reticle in accordance with the embodiment of the present invention.

Examples of the testing reticles for quantifying the amount of the residual resists are shown in plan views of FIGS. 7, 8, and 9. A first testing reticle shown in FIG. 7 includes a transparent mask substrate 90 and a light-shielding film 70 deposited on the mask substrate 90. A quartz glass can be used for the mask substrate 90 and the chromium (Cr) can be used for the light-shielding film 70, for example. In the light-shielding film 70, a plurality of transparent portions 80a, 80b, 80c, 80d, 80e and 80f are provided. Each shape of the transparent portions 80a-80f is a rectangular of the same width "$W_1$" congruent with the others. Each of the transparent portions 80a-80f is arranged in parallel to the others at a pitch "$T_1$" equal to "$W_1$". The polarized illumination light penetrates the mask substrate 90 through each of the transparent portions 80a-80f.

A second testing reticle shown in FIG. 8 includes a mask substrate 91 and a light-shielding film 71 deposited on the mask substrate 91. In the light-shielding film 71, a plurality of transparent portions 81a, 81b, 81c, 81d and 81e are provided. Each shape of the transparent portions 81a-81e is a rectangular of the same width "$W_2$" congruent with the others, which is arranged at the pitch "$T_1$" in the light-shielding film 71. Each width "$W_2$" of the transparent portions 81a-81e is twice as long as the pitch "$T_1$". The polarized illumination light penetrates the mask substrate 91 through each of the transparent portions 81a-81e.

A third testing reticle shown in FIG. 9 includes a mask substrate 92 and a light-shielding film 72 deposited on the mask substrate 92. In the light-shielding film 72, a plurality of transparent portions 82a, 82b, 82c and 82d are provided. Each shape of the transparent portions 82a-82d is a rectangular of the same width "$W_3$" congruent with the others, which is arranged at the pitch "$T_1$" in the light shielding film 72. Each width "$W_3$" of the transparent portions 82a-82d is six times as long as the pitch "$T_1$". The polarized illumination light penetrates the mask substrate 92 through each of the transparent portions 82a-82d.

With reference again to FIG. 2, a wafer stage aligner 115 is connected to the wafer stage 15. The wafer stage aligner 115 moves the wafer stage 15 to determine the position where the wafer stage 15 is to be placed. The first wafer 14 shown in FIG. 10 may be mounted on the wafer stage 15. The first step pattern 16 is displaced on the first wafer 14. A gate electrode extended in a predetermined direction "Y" is an example of the first step pattern 16. Also, a first resist 30 is coated on the first wafer 14. The first resist 30 is to be exposed with the polarized illumination light by the exposure tool 300.

Figure 11:
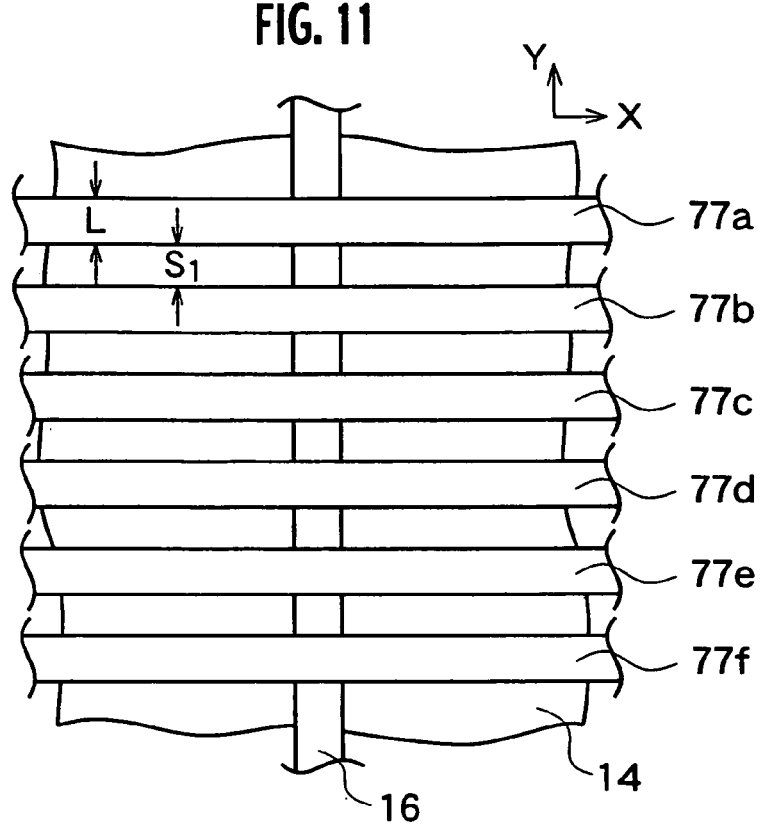
FIG. 11 is a first plan view of the first resist pattern in accordance with the embodiment of the present invention.

FIG. 11 shows a plan view of the first wafer 14 subjected to a projection of an image of the first testing reticle shown in FIG. 7 by the first light and a development of the first resist 30. Here, the first light is polarized such that the electric field of the illumination light is parallel to the first step pattern 16 on the first wafer 14 by the polarizer. A plurality of first resist patterns 77a, 77b, 77 c, 77d, 77e and 77f extended in a direction "X" perpendicular to the first step pattern 16 are formed over the first step pattern 16 on the first wafer 14. Each line width of the first resist patterns 77a-77f is "L". The first resist patterns 77a-77f are arranged at a space "$S_1$" equal to the line width "L".

Figure 12:
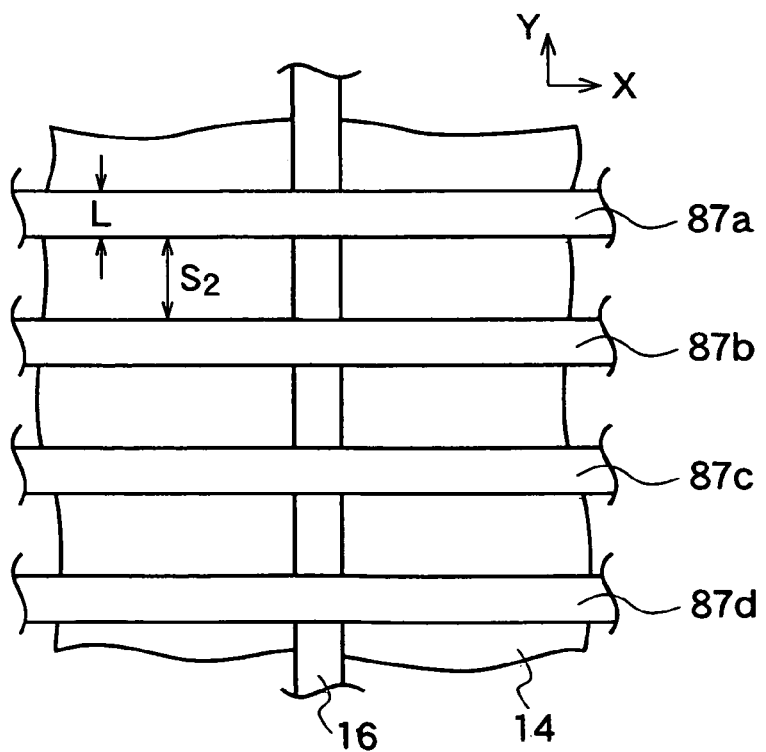
FIG. 12 is a second plan view of the first resist pattern in accordance with the embodiment of the present invention.

FIG. 12 shows a plan view of the first wafer 14 subjected to a projection of an image of the second testing reticle shown in FIG. 8 by the first light and a development of the first resist 30. A plurality of first resist patterns 87a, 87b, 87c and 87d extended in the direction "X" perpendicular to the first step pattern 16 are formed over the first step pattern 16 on the first wafer 14. Each line width of the first resist patterns 87a-87d is "L". The first resist patterns 87a-87d are arranged at a space "$S_2$" that is three times as long as the line width "L".

Figure 13:
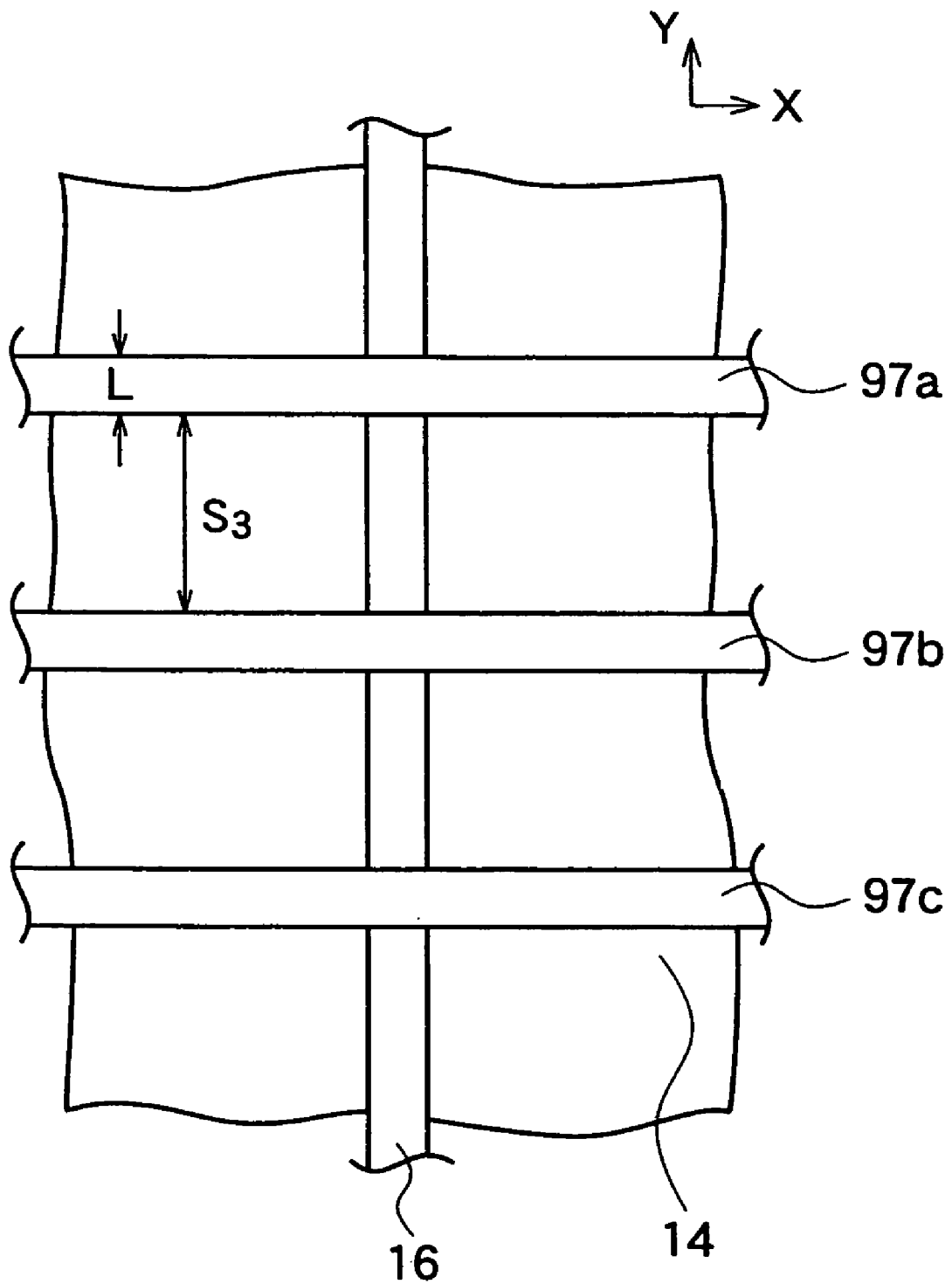
FIG. 13 is a third plan view of the first resist pattern in accordance with the embodiment of the present invention.

FIG. 13 shows a plan view of the first wafer 14 subjected to a projection of an image of the third testing reticle shown in FIG. 9 by the first light and a development of the first resist 30. A plurality of first resist patterns 97a, 97b and 97c extended in the direction "X" perpendicular to the first step pattern 16 are formed over the first step pattern 16 on the first wafer 14. Each line width of the first resist patterns 97a-97c is "L". The first resist patterns 97a-97c are arranged at a space "$S_3$" that is six times as long as the line width "L".

Also, second resist patterns are formed over second step patterns disposed on second wafers, respectively, by the second light. Here, each shape of the second step patterns and the second wafers is same as the shape of the first step pattern 16 and the first wafer 14 shown in FIG. 10. The second light is polarized such that the electric field of the illumination light is perpendicular to each of the second step patterns on the second wafers by the polarizer. The second resist patterns are formed in the following manner. Each of the second wafers is coated with a second resist in a similar way shown in FIG. 10. Thereafter, each image of the first, second, and third testing reticles shown in FIGS. 7, 8, and 9, respectively, is projected onto the second resist with the second light. By developing the second resist, the second resist patterns are formed. Drawings of the second resist patterns formed by the first, second, and third testing reticles shown in FIGS. 7, 8, and 9 are similar to the drawings of the first resist patterns shown in FIGS. 11, 12, and 13, respectively. Therefore, the drawings of the second resist patterns are omitted.

At the orthogonal point of the first step pattern 16 shown in FIG. 11 and the first resist pattern 77a, the spreading portions 57a-57d of the first residual resist remain on the first wafer 14 as shown in FIGS. 5 and 6. Although illustrations are omitted, such spreading portions of the first residual resist also remain at orthogonal points of the other first resist patterns 77b-77f shown in FIG. 11 and the first step pattern 16, at orthogonal points of the first resist patterns 87a-87d shown in FIG. 12 and the first step pattern 16, and at orthogonal points of the first resist patterns 97a-97c shown in FIG. 13 and the first step pattern 16. Further, spreading portions of the second residual resists remain at orthogonal points of the second step patterns and the second resist patterns formed by the second light on the second wafers. Drawing of the spreading portions of the second residual resists is similar to the drawing of the spreading portions 57a-57d of the first residual resists shown in FIG. 5. Therefore, the drawing of the spreading portions of the second residual resists is omitted.

With reference again to FIG. 1, the CPU 100 further includes an exposure tool controller 326, a measurement module 322, and a density calculator 327. Also, an exposure condition memory 338, a microscope 332, a simulator 301, and a polarization direction memory 336 are connected to the CPU 100.

The exposure tool controller 326 controls the exposure conditions of the exposure tool 300. For example, the exposure tool controller 326 instructs the reticle stage aligner 111 shown in FIG. 2 and the wafer stage aligner 115 to move the reticle stage 11 and the wafer stage 15 and set the placed position, a scanning direction, and a scanning speed. Moreover, the exposure tool controller 326 drives the polarizer holder rotator 66 to set the polarization direction of the polarized illumination light irradiated from the light source 3. Therefore, the first light and the second light are defined by the polarizer holder 6 and the polarizer holder, rotator 66. The exposure condition memory 338 stores illumination conditions in the exposure tool 300 such as the NA, a coherence factor (σ) and an aperture type for annular or quadrupolar illumination. Moreover, the exposure condition memory 338 stores design data of each reticle pattern of the first, second, and third testing reticles mounted on the reticle stage 11 of the exposure tool 300 shown in FIG. 2.

An atomic force microscope (AFM) and a scanning electron microscope (SEM) can be used for the microscope 332 shown in FIG. 1, for example. The microscope 332 obtains topographic images of the first resist patterns on the first wafers 14 shown in FIGS. 11, 12, and 13 and the second resist patterns on the second wafers. The microscope 332 transfers the topographic images to the data collector 321 as the information on the resist pattern formed over the step patterns.

The simulator 301 shown in FIG. 1 employs a Fourier transformation program which calculates light intensity of an image of the projected reticle pattern and a string model to calculate a surface shape of the resist pattern in the developed resist. The simulator 301 models shapes of the first resist patterns 77a-77f, 87a-87d and 97a-97c shown in FIGS. 11, 12, and 13, respectively, by simulating each projection of the first, second, and third testing reticles shown in FIGS. 7, 8, and 9 onto the first resist 30 shown in FIG. 10 with the first light. Also, the simulator 301 models shapes of the second resist patterns by simulating each projection of the first, second, and third testing reticles shown in FIGS. 7, 8, and 9 onto the second resist with the second light. The simulator 301 transfers the simulated shapes of the resist patterns to the data collector 321 as the information on the resist patterns formed over the step patterns.

The measurement module 322 shown in FIG. 1 analyzes the topographic image of the first resist patterns 77a-77f on the first wafer 14 shown in FIG. 11 which is obtained by the microscope 332. In a case where simulation results obtained by the simulator 301 are used, the measurement module 322 shown in FIG. 1 analyzes surface shape data of the first resist patterns 77a-77f on the first wafer 14 shown in FIG. 11 which is modeled by the simulator 301. By analyzing, the measurement module 322 shown in FIG. 1 measures each amount of the first residual resists "$d_1$"-"$d_4$" shown in FIG. 5 at each orthogonal point of the first step pattern 16 shown in FIG. 11 and the first resist patterns 77a-77f.

For example, in a case where the AFM or the SEM which is capable of obtaining a three-dimensional topographic image is used as the micro scope 332 shown in FIG. 1, the measurement module 322 executes a pattern recognition to identify the first step pattern 16 shown in FIG. 11 and the first resist patterns 77a-77f based on a histogram of height information of the topographic image. Further, the measurement module 322 measures surface height from the orthogonal point of the first step pattern 16 and the first resist pattern 77a to the edge of the spreading portion 57a shown in FIG. 5 where the surface height is equal to the height of the first wafer 14. The measurement module 322 shown in FIG. 1 calculates a perpendicular distance between the edge of the resist pattern 77a shown in FIG. 5 and the edge of the spreading portion 57a. The measurement module 322 defines the calculated perpendicular distance as the amount of first residual resist "$d_1$". Similarly, the measurement module 322 shown in FIG. 1 measures each amount of first residual resists "$d_2$"-"$d_4$" shown in FIG. 5.

Also for the orthogonal points of the other first resist patterns 77b-77f shown in FIG. 11 and the first step pattern 16, the measurement module 322 shown in FIG. 1 measures the amounts of the first residual resists "$d_1$"-"$d_4$" in a similar way. The measurement module 322 calculates the average of the amounts of the first residual resists "$d_1$"-"$d_4$" at all orthogonal points on the first wafer 14 shown in FIG. 11. The averaged amount of the first residual resists "$d_1$"-"$d_4$" about the first resist patterns 77a-77f represents an effect of the first light polarized parallel to the first step pattern 16 in a case where a ratio of the space "$S_1$" to each line width "L" of the first resist patterns 77a-77f is one.

The measurement module 322 also analyzes the orthogonal points of the first resist patterns 87a-87d shown in FIG. 12 and the first step pattern 16. The measurement module 322 calculates the average of the amounts of the first residual resists "$d_1$"-"$d_4$" at all orthogonal points on the first wafer 14. The averaged amount of the first residual resists "$d_1$"-"$d_4$" about the first resist patterns 87a-87d represents an effect of the first light in a case where a ratio of the space "$S_2$" to each line width "L" of the first resist patterns 87a-87d is three.

Further, the measurement module 322 analyzes the orthogonal points of the first resist patterns 97a-97c shown in FIG. 13 and the first step pattern 16. The measurement module 322 calculates the average of the amounts of the first residual resists "$d_1$"-"$d_4$" at all orthogonal points on the first wafer 14. The averaged amount of the first residual resists "$d_1$"-"$d_4$" about the first resist patterns 97a-97c represents an effect of the first light in a case where a ratio of the space "$S_3$" to each line width "L" of the first resist patterns 97a-97c is six.

In a similar way, the measurement module 322 shown in FIG. 1 analyzes the orthogonal points of the second resist patterns and the second step pattern. The measurement module 322 calculates the average of the amounts of the second residual resists "$d_1$"-"$d_4$" at all orthogonal points on the second wafer. The averaged amount of the second residual resists "$d_1$"-"$d_4$" about the second resist patterns formed by the first testing reticle shown in FIG. 7 represents an effect of the second light polarized perpendicular to the second step pattern in a case where a ratio of the space to each line width of the second resist patterns is one. The averaged amount of the second residual resists "$d_1$"-"$d_4$" about the second resist patterns formed by the second testing reticle shown in FIG. 8 represents an effect of the second light in a case where a ratio of the space to each line width of the second resist patterns is three. The averaged amount of the second residual resists "$d_1$"-"$d_4$" about the second resist patterns formed by the third testing reticle shown in FIG. 9 represents an effect of the second light in a case where a ratio of the space to each line width of the second resist patterns is six.

Note that each ratio of the spaces "$S_1$"-"$S_3$" to each line width "L" of the first resist pattern 77a-77f, 87a-87d, and 97a-97c shown in FIGS. 11, 12, and 13 is an example. Therefore, the ratio is not limited to the example and variable.

Figure 14:
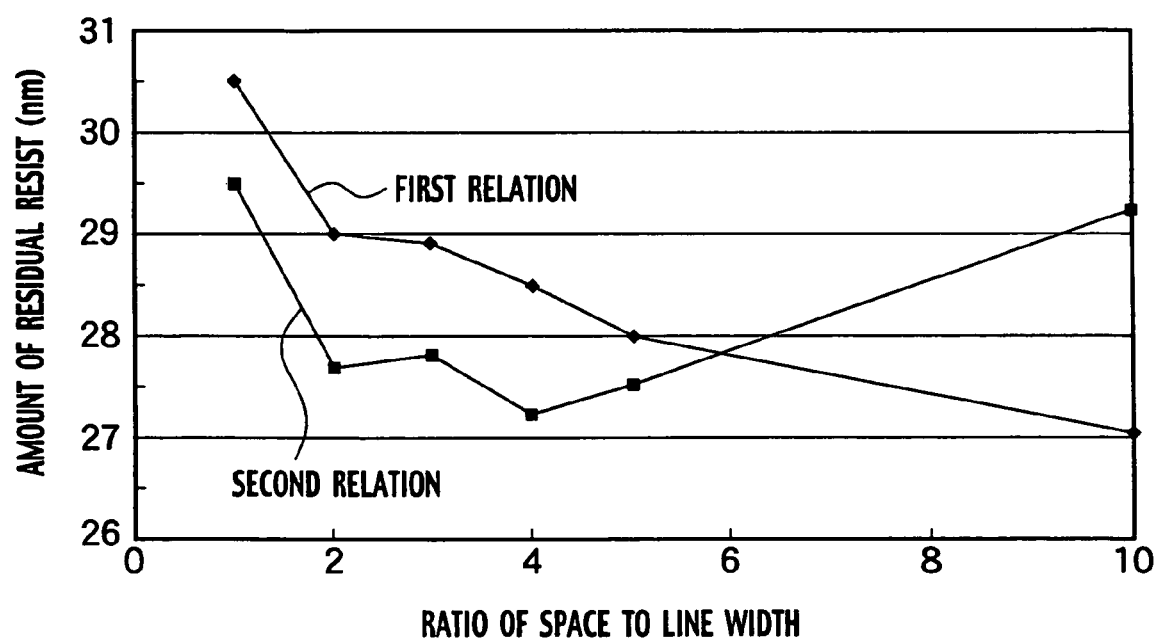
FIG. 14 is a sample graph of a ratio of a space to a line width of a resist pattern versus an amount of residual resists in accordance with the embodiment of the present invention.

With reference next to FIG. 14, the residual resist analyzer 323 shown in FIG. 1 obtains the first relation between the ratio of the space "S" to each line width "L" of the first resist patterns and the averaged amount of the first residual resists "$d_1$"-"$d_4$". Also, the residual resist analyzer 323 obtains the second relation between the ratio of the space "S" to each line width "L" of the second resist patterns and the averaged amount of the second residual resists "$d_1$"-"$d_4$". Here, in a case where the ratio of the space "S" to each line width "L" of the first and second resist patterns is less than six, the averaged amount, of the second residual resists "$d_1$"-"$d_4$" is smaller than the averaged amount of the first residual resists "$d_1$"-"$d_4$". On the contrary, in a case where the ratio of the space "S" to each line width "L" of the first and second resist patterns is six or more, the averaged amount of the first residual resists "$d_1$"-"$d_4$" is smaller than the averaged amount of the second residual resists "$d_1$"-"$d_4$".

Note that measurement result shown in FIG. 14 is an example under exposure conditions where the NA is 0.68 and the coherence factor (σ) is 0.75. When the exposure conditions are changed, the ratio of the space "S" to the line width "L" of the resist pattern also changes. Therefore, the polarization direction reducing the averaged amount of the residual resists "$d_1$"-"$d_4$" at certain ratio of the space "S" to each line width "L" of the resist patterns may change in accordance with the changes of the exposure conditions.

The direction chooser 324 shown in FIG. 1 chooses either the first light or the second light as the optimum polarization direction reducing the averaged amount of the residual resists "$d_1$"-"$d_4$" at certain ratio of the space "S" to each line width "L" of the resist patterns by comparing the first relation and the second relation. In the example case shown in FIG. 14, the direction chooser 324 determines that the polarization direction perpendicular to the step pattern is the optimum polarization direction in the case where the ratio of the space "S" to each line width "L" of the resist patterns is less than six. Also, the direction chooser 324 determines that the polarization direction parallel to the step pattern is the optimum polarization direction in the case where the ratio of the space "S" to each line width "L" of the resist patterns is six or more.

The polarization direction memory 336 stores a combination of the ratio of the space "S" to each line width "L" of the resist patterns and the optimum polarization direction determined by the direction chooser 324.

The density calculator 327 reads the design data of the reticle pattern stored in the exposure condition, memory 338. The density calculator 327 extracts an area of the projected reticle pattern of which longer direction is perpendicular to the longer direction of the step pattern. Further, the density calculator 327 calculates the ratio of the space "S" to the line width "L" of the projected reticle pattern.

With reference again to FIG. 1, an input unit 312, an output unit 313, a program memory 330, and a temporary memory 331 are also connected to the CPU 300. A keyboard and a mouse may be used for the input unit 312. An LCD or an LED may be used for the output unit 313. The program memory 330 stores a program instructing the CPU 300 to transfer data with apparatuses connected to the CPU 300. The temporary memory 331 stores temporary-data calculated during operation by the CPU 300.

Figure 15:
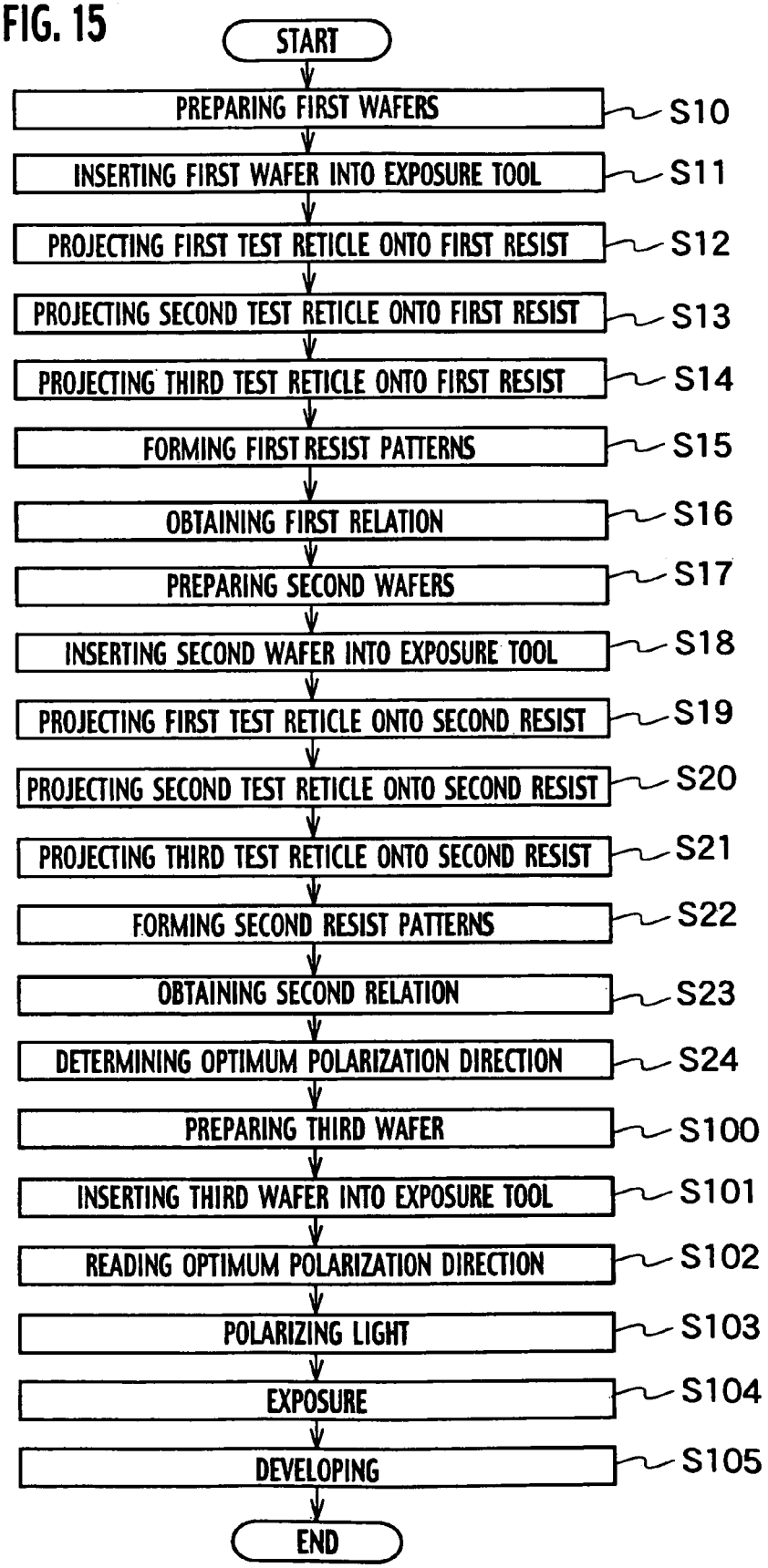
FIG. 15 is a first flowchart depicting a method for manufacturing a semiconductor device in accordance with the embodiment of the present invention.

With reference next to FIG. 15, a method for manufacturing a semiconductor device according to the embodiment of the present inventions is described.

Figure 10:
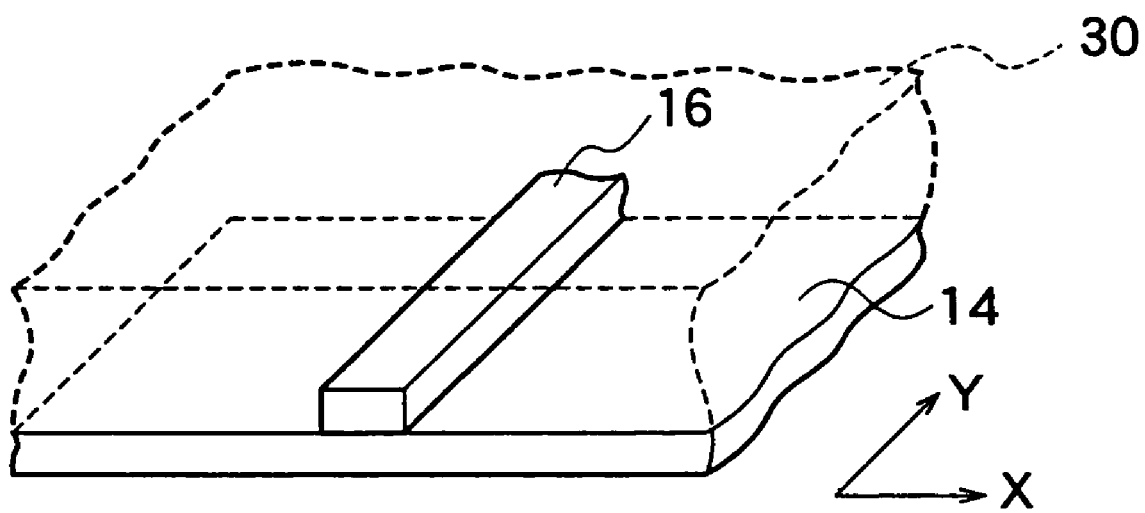
FIG. 10 is a perspective view of the first wafer in accordance with the embodiment of the present invention.

In step S10, the first wafers 14 shown in FIG. 10 are prepared. On each of the first wafers 14, the first step pattern 16 is disposed and the first resist 30 is coated over the first step pattern 16. In step S11, one of the first wafers 14 is inserted into the exposure tool 300 shown in FIG. 2. In step S12, the first testing reticle shown in FIG. 7 is mounted on the reticle stage 11 shown in FIG. 2 so that each longer direction of the transparent portions 80a-80f shown in FIG. 7 is perpendicular to the longer direction of the first step pattern 16 shown in FIG. 10. Thereafter, the exposure tool 300 shown in FIG. 2 projects the image of the transparent portions 80a-80f shown in FIG. 7 onto the first resist 30 shown in FIG. 10 with the first light.

In step S13, other one of the first wafers 14 is inserted into the exposure tool 300 shown in FIG. 2. The second testing reticle shown in FIG. 8 is mounted on the reticle stage 11 so that each longer direction of the transparent portions 81a-81e is perpendicular to the longer direction of the first step pattern 16. Thereafter, the exposure tool 300 projects the image of the transparent portions 81a-81e onto the first resist 30 with the first light.

In step S14, yet other one of the first wafers 14 is inserted into the exposure tool 300 shown in FIG. 2. The third testing reticle shown in FIG. 9 is mounted on the reticle stage 11 so that each longer direction of the transparent portions 82a-82d is perpendicular to the longer direction of the first step pattern 16. Thereafter, the exposure tool 300 projects the image of the transparent portions 82a-82d onto the first resist 30 with the first light.

In step S15, each first resist 30 is developed by developer solution to form the first resist patterns 77a-77f, 87a-87d, and 97a-97c shown in FIGS. 11, 12, and 13 corresponding to the first, second, and third testing reticles shown in FIGS. 7, 8, and 9, respectively. As shown in FIG. 11, each of the first resist patterns 77a-77f has the line-width "L" and is spaced apart "$S_1$" in parallel. As shown in FIG. 12, each of the first resist patterns 87a-87d has the line width "L" and spaced apart "$S_2$" in parallel. As shown in FIG. 13, each of the first resist patterns 97a-97c has the line width "L" and spaced apart "$S_3$" in parallel. Each longer direction of the first resist patterns 77a-77f, 87a-87d, 97a-97c is perpendicular to the longer direction of the first step pattern 16 on the first wafer 14.

In step S16, the microscope 332 shown in FIG. 1 obtains the topographic images of the first resist patterns 77a-77f, 87a-87d, and 97a-97c shown in FIGS. 11, 12, and 13. Thereafter, the data collector 321 transfers the topographic images from the microscope 332 to the measurement module 322. The measurement module 322 measures the amount of the first residual resists "$d_1$"-"$d_4$" shown in FIG. 5 at the orthogonal point of the first step pattern 16 and each of the first resist patterns 77a-77f, 87a-87d, and 97a-97c shown in FIGS. 11, 12, and 13. Subsequently, the measurement module 322 calculates the averaged amount of the first residual resists. Then, the residual resist analyzer 323 obtains the first relation between the ratio of the space "S" to each line width "L" of the first resist patterns and the averaged amount of the first residual resists.

In step S17, the second, wafers are prepared. On each of the second wafers, the second step pattern is disposed and the second resist is coated over the second step pattern. The shape of the second step pattern is similar to the shape of the first step pattern 16 shown in FIG. 10. In step S18, one of the second wafers is inserted into the exposure tool 300 shown in FIG. 2.

In step S19, the first testing reticle shown in FIG. 7 is mounted on the reticle stage 11 shown in FIG. 2 so that each longer direction of the transparent portions 80a-80f shown in FIG. 7 is perpendicular to the longer direction of the second step pattern. Thereafter, the exposure tool 300 shown in FIG. 2 projects the image of the transparent portions 80a-80f shown in FIG. 7 onto the second, resist with the second light.

In step S20, other one of the second wafers is inserted into the exposure tool 300 shown in FIG. 2. The second testing reticle shown in FIG. 8 is mounted on the reticle stage 11 so that each longer direction of the transparent portions 81a-81e is perpendicular to the longer direction of the second step pattern. Thereafter, the exposure tool 300 projects the image of the transparent portions 81a-81e onto the second resist with the second light.

In step S21, yet other one of the second wafers is inserted into the exposure tool 300 shown in FIG. 2. The third testing reticle shown in FIG. 9 is mounted on the reticle stage 11 so that each longer direction of the transparent portions 82a-82d is perpendicular to the longer direction of the second step pattern. Thereafter, the exposure tool 300 projects the image of the transparent portions 82a-82d onto the second resist with the second light.

In step S22, each second resist is developed by developer solution to form the second resist patterns. The second resist patterns are similar to the first resist patterns 77a-77f, 87a-87d, 97a-97c shown in FIGS. 11, 12, and 13 corresponding to the first, second, and third testing reticles shown in FIGS. 7, 8, and 9, respectively. Each of the second resist patterns has the line width "L" and is spaced apart "$S_1$", "$S_2$", and "$S_3$", respectively. Each longer direction of the second resist patterns is perpendicular to the longer direction of the second step pattern on the second wafer.

In step S23, the microscope 332 shown in FIG. 1 obtains the topographic images of the second resist patterns. Thereafter, the data collector 321 transfers the topographic images from the microscope 332 to the measurement module 322. The measurement module 322 measures the amount of the second residual resists "$d_1$"-"$d_4$" at the orthogonal point of the second step pattern and each of the second resist patterns as similar to the first resist patterns. Then, the measurement module 322 calculates the averaged amount of the second residual, resists. Subsequently, the residual resist analyzer 323 obtains the second, relation between the ratio of the space "S" to each line width "L" of the second resist patterns and the averaged amount of the second residual resists.

In step S24, the direction chooser 324 compares the first relation and the second relation to determine the optimum polarization direction of the illumination light that reduces, the amount of residual resists "$d_1$"-"$d_4$". Then, the direction chooser 324 stores the optimum polarization direction at the certain ratio of the space "S" to each line width "L" of the resist patterns in the polarization direction memory 336.

In step S100, the third wafer is prepared. On the third wafer, the third step pattern is disposed and the third resist is coated over the third step pattern. In step S101, the third wafer is mounted on the wafer stage 15 shown in FIG. 2 in the exposure tool 300. In step S102, the density calculator 327 reads the design data of a device pattern of a reticle for manufacturing the semiconductor device stored in the exposure condition memory 338. The density calculator 327 extracts the area of the projected reticle pattern of which longer direction is perpendicular to the longer direction of the third step pattern. Subsequently, the density calculator 327 calculates the ratio of the space "S" to the line width "L" of the projected reticle pattern. Then, the exposure tool controller 326 refers to the polarization direction memory 336 for the optimum polarization direction reducing the amount of the residual resists "$d_1$"-"$d_4$" at the orthogonal point of third step pattern and the projected reticle pattern based on the calculated ratio of the space "S" to the line width "L" of the projected reticle pattern.

In step S103, the exposure tool controller 326 adjusts the polarizer holder 6 so that the polarization direction of the illumination light reduces the amount of the residual resists. In step S104, the exposure tool 300 projects the device pattern onto the third resist on the third wafer. In step S105, the third resist is developed by developer solution to form the third resist pattern of which longer direction is perpendicular to the longer direction of the third step pattern on the third wafer. Thereafter, the insulating film formation and the circuit layer formation are repeated until the manufacturing of the semiconductor device is completed.

Figure 16:
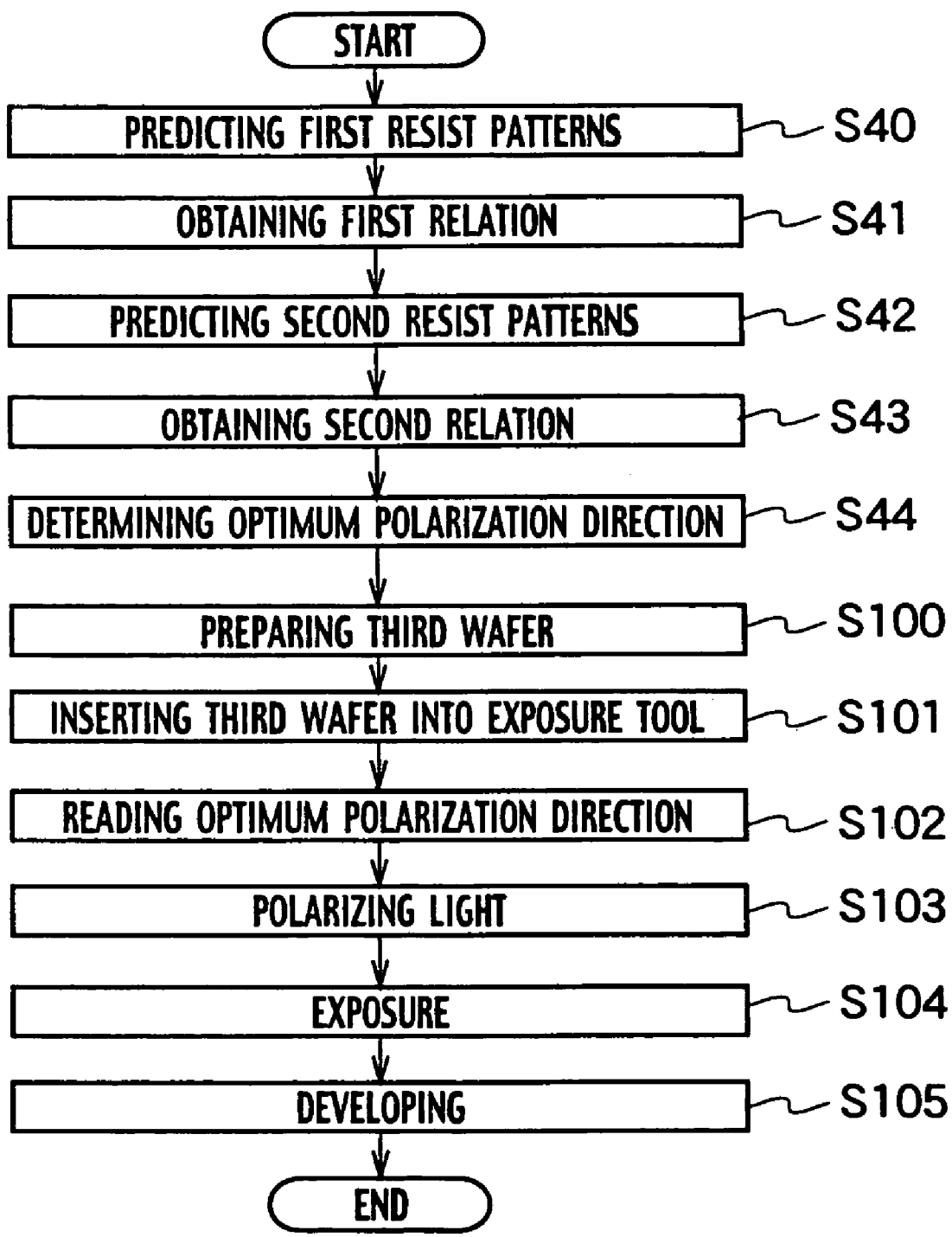
FIG. 16 is a second flowchart depicting the method for manufacturing the semiconductor device in accordance with the embodiment of the present invention.

With reference next to FIG. 16, a method for manufacturing the semiconductor device in a case where the simulator 301 shown in FIG. 1 is used is described.

In step S40, the simulator 301 simulates each projection of the transparent portions 80a-80f shown in FIG. 7, the transparent portions 81a-81e shown in FIG. 8, and the transparent portions 82a-82d shown in FIG. 9 onto the first resist 30 shown in FIG. 10 with the first light. Subsequently, the simulator 301 simulates the development of the first resist 30 to model the shape of the first resist patterns 77a-77f, 87a-87d, and 97a-97c shown in FIGS. 11, 12, and 13 corresponding to the first, second, and third testing reticles shown in FIGS. 7, 8, and 9, respectively. The simulator 301 shown in FIG. 1 stores the predicted shapes in the temporary, memory 331.

In step S41, the data collector 321 transfers the predicted shape from the temporary memory 331 to the measurement module 322. The measurement module 322 measures the amount of first residual resists "$d_1$"-"$d_4$" shown in FIG. 5 at the orthogonal point of the first step pattern 16 and each of the first resist patterns 77a-77f, 87a-87d, and 97a-97c based on the predicted shapes. Subsequently, the measurement module 322 calculates the averaged amount of the first residual resists. Then, the residual resist analyzer 323 obtains the first relation between the ratio of the space "S" to each line width "L" of the first resist patterns and the averaged amount of the first residual resists.

In step S42, the simulator 301 simulates each projection of the transparent portions 80a-80f shown in FIG. 7, the transparent portions 81a-81e shown in FIG. 8, and the transparent portions 82a-82d shown in FIG. 9 onto the second resist with the second, light. Subsequently, the simulator 301 simulates the development of the second resist to model the shape of the second resist patterns. The simulator 301 stores the predicted shapes of the second resist patterns in the temporary memory 331.

In step S43, the data collector 321 transfers the predicted shape from the temporary memory 331 to the measurement module 322. The measurement module 322 measures the amount of the second residual resists "$d_1$"-"$d_4$" at the orthogonal point of the second step pattern and each of the second resist patterns based on the predicted shapes. Subsequently, the measurement module 322 calculates the averaged amount of the second residual resists. Then, the residual resist analyzer 323 obtains the second relation between the ratio of the space "S" to each line width "L" of the second resist patterns and the averaged amount of the second residual resists.

In step S44, the direction chooser 324 compares the first relation and the second relation to determine the optimum polarization direction of the illumination light that reduces the amount of residual resists "$d_1$"-"$d_4$". Then, the direction chooser 324 stores the optimum polarization direction at the certain ratio of the space "S" to each line width "L" of the resist patterns determined by the direction chooser 324 in the polarization direction memory 336. Thereafter, steps S100-S105 are carried out as similar to the methods shown in FIG. 15.

As described above, the polarization analyzing system shown in FIG. 1 determines the optimum polarization direction based on the pattern density of the resist pattern expressed as the ratio of the space "L" to the line width "S" in the case where the resist pattern is formed on the step pattern on the wafer and the longer direction of the resist pattern is perpendicular to the longer direction of the step pattern. Accordingly, the polarization analyzing system makes it possible to effectively reduce the amount of residual resists "$d_1$"-"$d_4$" shown in FIG. 5 at the orthogonal point of the step pattern and each of the resist patterns.

In earlier methods, in a case where the resist coated on the step pattern is exposed to the illumination light, it has been assumed that confining the oscillation of the linearly polarized light to the direction perpendicular to the longer direction of the step pattern reduces the scattering of the illumination light on the wafer. There fore, the oscillation of the linearly polarized light is always confined to the direction perpendicular to the longer direction of the step pattern.

However, the polarization analyzing system shown in FIG. 1 does not always only use the polarized light of which polarization direction is perpendicular to the longer direction of the step pattern. The polarization analyzing system shown in FIG. 1 also use the polarized illumination light of which polarization direction is parallel with the longer direction of the step pattern based on the ratio of the space "L" to each line width "S" of the resist patterns to be formed. Therefore, the polarization analyzing system makes it possible to precisely reproduce the designed circuit pattern on the wafer even at the orthogonal point of the step pattern and each of the resist patterns.

Further, by storing a database of combinations of the optimum polarization direction and the ratio of the space "L" to each line width "S" of the resist patterns in the polarization direction memory 336, it is possible to instantly select the appropriate polarization direction when the reticle pattern is projected onto the resist. It should be noted that the order to carry out the steps of the method for manufacturing the semiconductor device shown in FIGS. 15 and 16 is changeable.

Modification

In the embodiment, the polarizer shown in FIG. 3 or FIG. 4 is inserted to the polarizer holder 6 shown in FIG. 2. However, type of the polarizer is not limited to the polarizer shown in FIG. 3 or FIG. 4. For example, the polarizer shown in FIG. 17 or FIG. 18 also can be used. The polarizer shown in FIG. 17 has a plate 44 and a plurality of circular polarizing filters 45*a*, 45*b*, 45*c*, 45*d*, 45*e*, 45*f*, 45*g*, and 45*h* provided in the plate 44. The polarizing filters 45*a*-45*h* are located around the center of the plate 44. The polarizing filters 45*a*-45*h* are oriented so that the illumination light is polarized radially away from the optical axis.

Figure 17:
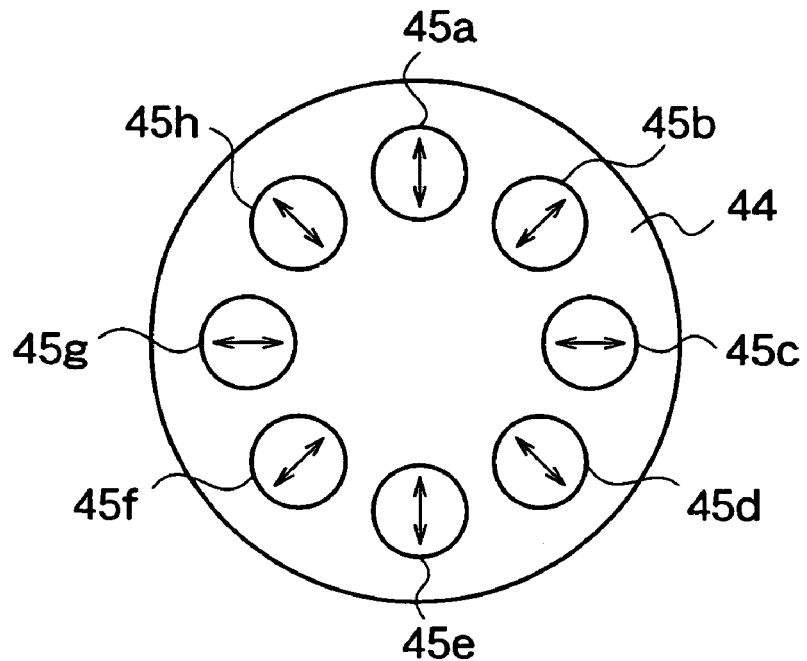
FIG. 17 is a first plan view of a polarizer in accordance with a modification of the embodiment of the present invention.
Figure 18:
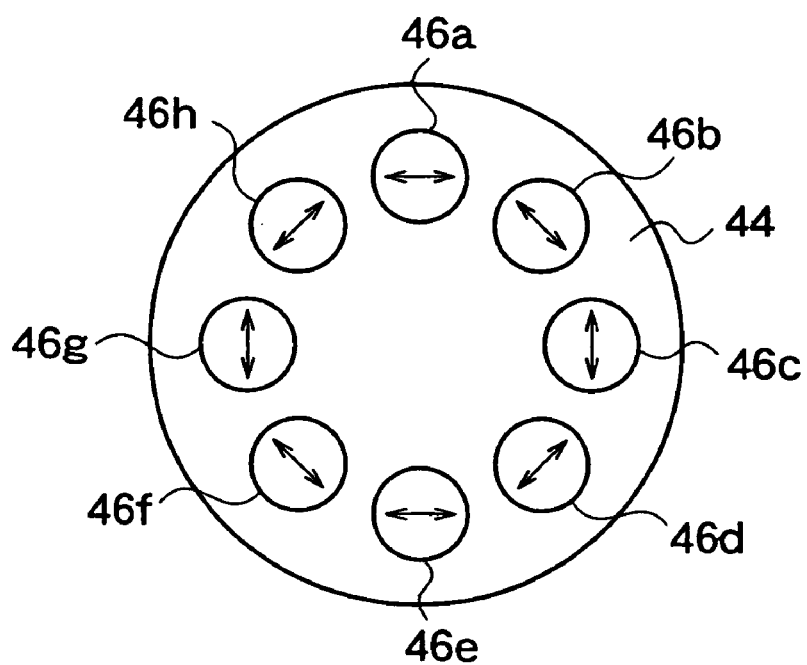
FIG. 18 is a second plan view of the polarizer in accordance with the modification of the embodiment of the present invention.
Figure 19:
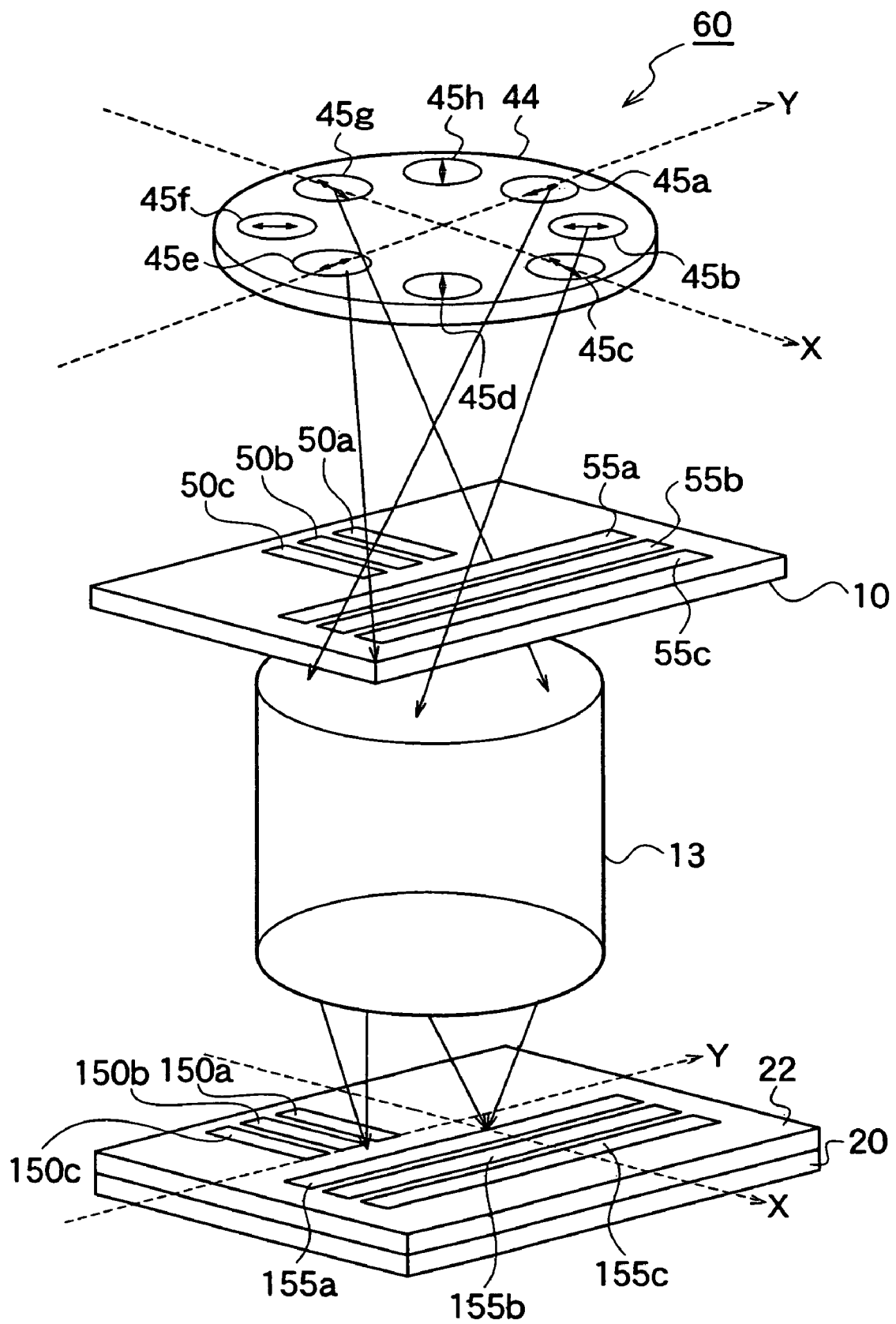
FIG. 19 illustrates an exposure tool in accordance with the modification of the embodiment of the present invention.

The polarizer shown in FIG. 18 has a plate 44 and a plurality of circular polarizing filters 46*a*, 46*b*, 46*c*, 46*d*, 46*e*, 46*f*, 46*g*, and 46*h* provided in the plate 44. The polarizing filters 46*a*-46*h* are oriented so that the illumination light is azimuthally polarized. With reference to FIG. 19, an optical effect in a case where the polarizer shown in FIG. 17 is used is described. In FIG. 19, a polarizer 60 including the plate 44 and the plurality of polarizing films 45*a*-45*h* provided in the plate 44, a reticle 10 including a plurality of transparent portions 50*a*, 50*b*, 50*c*, 55*a*, 55*b*, and 55*c* disposed beneath the polarizer 60, a projection optical system 13 disposed beneath the reticle 10, and a wafer 20 coated with a resist 22 disposed beneath the projection optical system 13 are illustrated.

The transparent portions 50*a*-50*c* provided in the reticle 10 are arranged along an "X" direction, whereas the transparent portions 55*a*-55*c* provided in the reticle 10 are arranged along a "Y" direction perpendicular, to the "X" direction.

In this case, polarized illumination lights transmitted through the polarizing films 45*a* and 45*e* located along the "Y" direction primarily contribute to a projection of an image of the transparent portions 50*a*-50*c* along with the "X" direction onto the resist 22 and a formation of the projected images 150*a*, 150*b*, and 150*c*. Other polarized illumination lights transmitted through the polarizing films 45*b*-45*d* and 45*f*-45*h* penetrate the transparent portions 50*a*-50*c* and zero order diffracting light is generated at the transparent portions 50*a*-50*c*. The zero order diffracting light contributes to the formation of the projected images 150*a*, 150*b*, and 150*c* as a bias component. However, intensity of the zero order diffracting light is too weak. Therefore, a contribution of the zero order diffracting light to the formation of the projected images 150*a* and 150*b* is negligible.

On the other hand, polarized illumination lights transmitted through the polarizing films 45*c* and 45*g* located along the "X" direction primarily contribute to a projection of an image of the transparent portions 55*a*-55*c* along with the "Y" direction onto the resist 22 and a formation of the projected images 155*a*, 155*b*, and 155*c*. The intensity of other polarized illumination lights transmitted through the polarizing films 45*a*, 45*b*, 45*d*-45*f*, and 45*h* is too weak. Therefore, a contribution of the other polarized illumination lights to the formation of the projected images 155*a*-155*c* is negligible.

Therefore, the projected images 150*a*-150*c* along with the "X" direction are formed by the illumination light polarized parallel with the "Y" direction. The projected images 155*a*-155*c* along with the "Y" direction are formed by the illumination light polarized parallel with the "X" direction.

Accordingly, in a case where a step pattern along with the "Y" direction is disposed on the wafer 20 and the projected images 150*a*-150*c* are formed over the step pattern along with the "Y" direction, the projected images 150*a*-150*c* along with the "X" direction are formed by the first light which is polarized such that the electric field of the illumination light is parallel to the longer direction of the step pattern along with the "Y" direction. Further, in a case where a step pattern along with the "X" direction is disposed on the wafer and the projected images 155*a*-155*c* are formed over the step pattern along with the "X" direction, the projected images 155*a*-155*c* along with the "Y" direction are also formed by the first light which is polarized such that the electric field of the illumination light is parallel to the longer direction of the step pattern along with the "X" direction.

Consequently, in a case where all projected images 150*a*-150*c* and projected images 155*a*-155*c* are spaced apart "S" corresponding to a length that the first light reduces the residual resists at the orthogonal points of the step patterns and the resist patterns formed by developing the resist 22, the polarizer 60 makes it possible to effectively reduce the amount of the residual resists even though the step pattern beneath the projected images 150*a*-150*c* is perpendicular to the step pattern beneath the projected images 155*a*-155*c*. Also, in a case where all projected images 150*a*-150*c* and 155*a*-155*c* are spaced apart "S" corresponding to a length that the second light reduces the residual resists, the polarizer shown in FIG. 18 makes it possible to effectively reduce the amount of residual resists.

With reference next to FIG. 20, a method for manufacturing the semiconductor device according to the modification of the embodiment is described.

In step S201, the step patterns are formed on the wafer 20 shown in FIG. 19. Then, the resist 22 is coated over the step patterns on the wafer 20. In step S202, the wafer 20 is mounted on the wafer stage 15 shown in FIG. 2 in the exposure tool 300. In step S203, the reticle 10 shown in FIG. 19 is mounted on the reticle stage 11 shown in FIG. 2. In this case, the step pattern along with the "X" direction is located beneath a field where the projected images 155*a*-155*c* shown in FIG. 19 are to be projected. Also, the step pattern along with the "Y" direction is located beneath a field where the projected images 150*a*-150*c* are to be projected.

In step S204, the density calculator 327 shown in FIG. 1 reads the design data of the reticle pattern stored in the exposure condition memory 338. Then, the density calculator 327 extracts the area of the projected image of the reticle pattern of which longer direction is perpendicular to the longer direction of the step pattern on the wafer. Subsequently, the density calculator 327 calculates the ratio of the space "S" to the line width "L" of the extracted projected image of the reticle pattern. The exposure tool controller 326 refers to the polarization direction memory 336 for the optimum polarization direction reducing the amount of the residual resists "$d_1$"-"$d_4$" at the orthogonal point of the step patterns and the projected reticle pattern based on the calculated ratio of the space "S" to the line width "L" of the projected reticle pattern.

In step S205, in a case where the first light is chosen in the step S204, the polarizer shown in FIG. 17 is inserted to the polarizer holder 6 shown in FIG. 2. Thereafter, the illumination light is emitted from the light source 3 and the illumination light is polarized radially away from the optical axis in the exposure tool 300.

In step S206, in a case where the second light is chosen in the step S204, the polarizer shown in FIG. 18 is inserted to the polarizer holder 6 shown in FIG. 2. Thereafter, the illumination light is emitted from the light source 3 and the illumination light is azimuthally polarized. Thereafter, steps S207 and S208 are carried out as similar to the steps S104 and S105 shown in FIG. 15.

As described above, the method for manufacturing the semiconductor device shown in FIG. 20 makes it possible to project the image of the transparent portions 50a-50c and 55a-55c shown in FIG. 19 onto the resist 22 by the illumination light polarized in the optimum polarization direction, even thought the transparent portion 50a-50c are arranged in perpendicular to the transparent portions 55a-55c and the step patterns are perpendicular to the projected images 150a-150c and the projected images 155a-155c.

Other Embodiments

Although the invention has been described above by reference to the embodiment of the present invention, the present invention is not limited, to the embodiment described above. Modifications and variations of the embodiment described above will occur to those skilled in the art, in the light of the above teachings.

For example, in the steps S102 to S105 shown in FIG. 15, the density calculator 327 extracts the area of the projected reticle pattern of which longer direction is perpendicular to the step pattern and calculates the ratio of the space "S" to the line width "L" of the projected reticle pattern. Then, the optimum polarization direction is chosen to project the image of the reticle pattern.

However, there is a case where the ratio of the space "S" to the line width "L" of the projected reticle pattern is not even. In this case, both of a field where the first light is effective in reducing the residual resists and a field where the second light is effective may exist on the same wafer. To solve such problem, dividing the design data of the reticle pattern into two regions is an alternative. One of the regions contains a part of the reticle pattern where the first light is effective. Another one of the regions contains, a part of the reticle pattern where the second light is effective. Then, a first reticle including the reticle pattern where the first light is effective and a second reticle including the reticle pattern where the second light is effective are manufactured. After an image of the first reticle is projected onto the resist by the first light, an image of the second reticle is projected onto the same resist. Consequently, it is possible to re-produce the designed circuit pattern on the resist even though the ratio of the space "S" to the line width "L" of the projected reticle pattern is not even. It should be noted that the order to project the images of the first and second reticles is changeable.

Moreover, providing two patterns on a reticle is another alternative. Specifically, the reticle including a first reticle pattern where the first light is effective and a second reticle pattern where the second light is effective is manufactured. After the reticle is mounted on the reticle stage 11, the exposure tool 300 projects an image of the first reticle pattern onto the resist. Thereafter, the reticle stage 11 is moved by the reticle, stage aligner 111. Subsequently, the exposure tool 300 projects an image of the second reticle pattern onto the sane, resist.

As described above, the present invention includes many variations of embodiments. Therefore, the scope of the invention is defined with reference to the following claims.

What is claimed is:

1. A polarization analyzing system comprising:
    a data collector configured to collect an information on resist patterns formed over step patterns disposed on wafers by first and second lights, respectively, the resist patterns being perpendicular to the step patterns, the first and second lights being polarized parallel and perpendicular to the step patterns, respectively;
    a residual resist analyzer configured to obtain first and second relations between a ratio of a space to a line width of the resist patterns and first and second residual resists on the wafers, respectively, the first and second residual resists remaining at orthogonal points of the step patterns and the resist patterns formed by the first and second lights, respectively; and
    a direction chooser configured to choose an optimum polarization direction reducing residual resists by comparing the first and second relations.

2. The system of claim 1, further comprising a microscope configured to observe the first and second residual resists.

3. The system of claim 1, further comprising a simulator configured to model shapes of the first and second residual resists.

4. The system of claim 1, further comprising an exposure condition memory configured to store design data of a reticle pattern for manufacturing a semiconductor device.

5. The system of claim 4, further comprising a density calculator configured to calculate a ratio of a space to a line width of a projected image of the reticle pattern.

6. The system of claim 5, further comprising an exposure tool configured to project the reticle pattern onto a resist by using a light polarized in the optimum polarization direction.

* * * * *